(12) United States Patent
Maguire, Jr.

(10) Patent No.: US 6,246,382 B1
(45) Date of Patent: Jun. 12, 2001

(54) APPARATUS FOR PRESENTING STEREOSCOPIC IMAGES

(76) Inventor: Francis J. Maguire, Jr., 88 Greenwood Dr., Southbury, CT (US) 06488

( * ) Notice: Subject to any disclaimer, the term of this patent is extended or adjusted under 35 U.S.C. 154(b) by 0 days.

(21) Appl. No.: 09/195,850

(22) Filed: Nov. 19, 1998

Related U.S. Application Data

(63) Continuation of application No. 08/884,810, filed on Jun. 30, 1997, now Pat. No. 6,094,182, which is a continuation of application No. 08/025,975, filed on Mar. 3, 1993, now Pat. No. 5,644,324.

(51) Int. Cl.[7] .................................................. G09G 5/00
(52) U.S. Cl. ...................................... 345/8; 345/9
(58) Field of Search ................................. 345/8, 9, 7, 139

(56) References Cited

U.S. PATENT DOCUMENTS

| 4,181,408 | 1/1980 | Senders | 351/159 |
|---|---|---|---|
| 4,300,818 | 11/1981 | Schachar | 351/7 |
| 5,125,733 | 6/1992 | Lee | 353/7 |
| 5,175,616 | 12/1992 | Milgram et al. | 358/88 |
| 5,252,950 | 10/1993 | Saunders et al. | 345/9 |
| 5,363,241 | 11/1994 | Hegg et al. | 359/676 |
| 5,365,370 | 11/1994 | Hudgins | 359/464 |

FOREIGN PATENT DOCUMENTS 3-292093 12/1991 (JP).

Primary Examiner—Matthew Luu

(57) ABSTRACT

A method and apparatus for providing, in response to successive image signals and a control signal, the successive images at various apparent distances. The relationship between accommodation and convergence may be preserved. The images may have a highly detailed component which has its image content changed according to changes in the direction of a monitored one or more visual axes. The images may be provided stereoscopically.

28 Claims, 8 Drawing Sheets

APPARATUS FOR PRESENTING STEREOSCOPIC IMAGES

This application is a continuation of Ser. No. 08/884,810 filed Jun. 30, 1997 now U.S. Pat. No. 6,094,182 which is a continuation of Ser. No. 08/025,975 filed Mar. 3, 1993 now U.S. Pat. No. 3,644,324 and from which priority is claimed under 35 U.S.C. § 120.

TECHNICAL FIELD

The present invention relates to the presentation of images and, more particularly, to the presentation of successive images.

BACKGROUND ART

Virtual reality, immersive simulation, artificial reality, telepresence, virtual world, virtual environment and similar terms are used to describe a viewer-display interface in which successive images are presented and controlled as to content by gestures, by walking around, looking around and using the viewer's hands to simulate the manipulation of objects. But since the images are effectively presented at infinity there is a problem in presenting such images of near objects without discomfort in the viewer's eyes. When close objects are presented, the feeling of discomfort arises because an image at infinity is viewed with accommodation for infinity with a high degree of convergence of the viewer's eyes. This sense of discomfort makes such a presentation of successive images hard to accept and is not easy to look at, especially for long periods. It would be advantageous to be able to provide both close and distant successive images for virtual reality without discomfort.

In the past, a static kind of virtual reality was provided by the parlor stereoscope. It was used to present stereograms taken from differing perspectives corresponding to the separation between human eyes, more or less, to provide a striking illusion of depth. Since such stereograms typically show a distant scene there is little discomfort to the human visual apparatus. However, if "near" objects are presented, as above, the same discomfort arises.

On the other hand, stereo image pairs are now increasingly used for various purposes, including everything from motion pictures to clinical diagnosis. In recent years, the presentation of successive stereopair images has been by means of television. These images have also typically presented both near and far objects as if from infinity. It would be advantageous to be able to provide virtual reality and similar successive image techniques in stereo embodiments that would enable viewing of close "objects" but would eliminate discomfort arising from viewing such close "objects" imaged as if from infinity.

As known, computer imaging calls for extraordinarily high amounts of memory. Virtual reality also suffers from very high speed demands. In fact, there is unfortunately a perceptible lag in the image response of present day hardware. In other words, the viewer will execute movements that will call for changes in the content of the images presented but the hardware will only be able to provide such changed images to the viewer after a delay that makes the viewer wait for the images to "catch up." See *Looking Glass Worlds*, by Ivars Peterson, *Science News*, Jan. 4, 1992, Vol. 141, No. 1, pp. 8–10, 15. It would be advantageous to speed up the process and reduce or eliminate the lag.

DISCLOSURE OF THE INVENTION

An object of the present invention is to provide a new method and means of presenting images in succession.

Another object of the present invention is to provide successive images of the scene closer to the viewer so as to allow the close examination of imaged objects.

Still another object of the present invention is to present such images without viewer discomfort.

In accordance with a first aspect of the present invention, the successive images are provided at various apparent distances such that a viewer's eye may accommodate to focus on the successive images at the various apparent distances.

In further accord with the first aspect of the present invention, the various apparent distances are selected in such a way as to substantially preserve a normal relationship between accommodation and distance.

In accordance with a second aspect of the present invention, additional successive images are provided at the various apparent distances such that a viewer's eyes may accommodate stereoscopically to focus on the successive images and the additional successive images at the various apparent distances.

In further accord with this second aspect of the present invention, the various apparent distances are selected so as to preserve a normal relationship between accommodation and convergence for the viewer. In this way, the viewer's versions at the various depths within the image space correspond closely to the way in which the viewer would normally acquire visual information in real object spaces.

Still further in accordance with this second aspect of the present invention, the successive optical images are provided from at least one image source for presentation to at least one of the viewer's eyes and wherein the additional successive optical images are provided from at least another image source for presentation to at least one of the viewer's eyes.

Alternatively, in still further accord with this second aspect of the present invention, the successive optical images and the additional successive optical images are provided from a single image source and wherein the successive optical images are for presentation to at least one of the viewer's eyes and wherein the additional successive optical images are for presentation to at least one of the observer's eyes.

In accordance with a third aspect of the present invention, the images provided are mixed images for permitting a less intensive use of memory and bandwidth thereby enabling a speedup in the imaging process.

A "mixed image" comprises one or more images having areas of greater and lesser resolution together being simulative of foveal resolution. For example, such may comprise both highly detailed and lesser detailed portions or, alternatively, in the sense that individual images may individually be of uniform but different resolutions, i.e., may be either highly or lesser detailed, but together such images may be interleaved in some convenient manner, not necessarily alternately, to form a series of images which have the same effect as a series of images with different resolutions in each. A "mixed image signal" is an image signal conditioned so as to produce a mixed image.

The present invention provides a new approach to the presentation of successive optical images of an object space at various apparent distances to a viewer in an image space. The various apparent distances may be controlled by the viewer's eyes which perceive the images as objects, seemingly putting the viewer inside a virtual object space. Or, in a passive embodiment, the various apparent distances are controlled by a cameraman or some other agent (which may include a computer) at the time of image acquisition or formation.

The present invention may be used in a wide variety of applications including entertainment, education and others in which the viewing of successive viewing is appropriate. The manner of presentation is so realistic and such a radical departure from present approaches that viewers are better able to suspend disbelief that the images are not real.

By way of example and not limitation, the successive images may be presented to a screen for viewing by a viewer such as is shown in U.S. Pat. Nos. 4,515,450 & 4,427,274 or PCT Patent WO 86/01310 in conjunction with, e.g., a pair of light shutter or polarizer glasses such as shown in U.S. Pat. No. 4,424,529, or may be provided via image sources in a helmet for mounting on a viewer's head in an approach suggested by U.S. Pat. Nos. 4,636,866, or 4,310,849, or many other possible presentation approaches including but not limited to others described below.

These and other objects, features and advantages of the present invention will become more apparent in light of a detailed description of a best mode embodiment thereof which follows, as illustrated in the accompanying drawing.

BEST MODE FOR CARRYING OUT THE INVENTION

Figure 1:
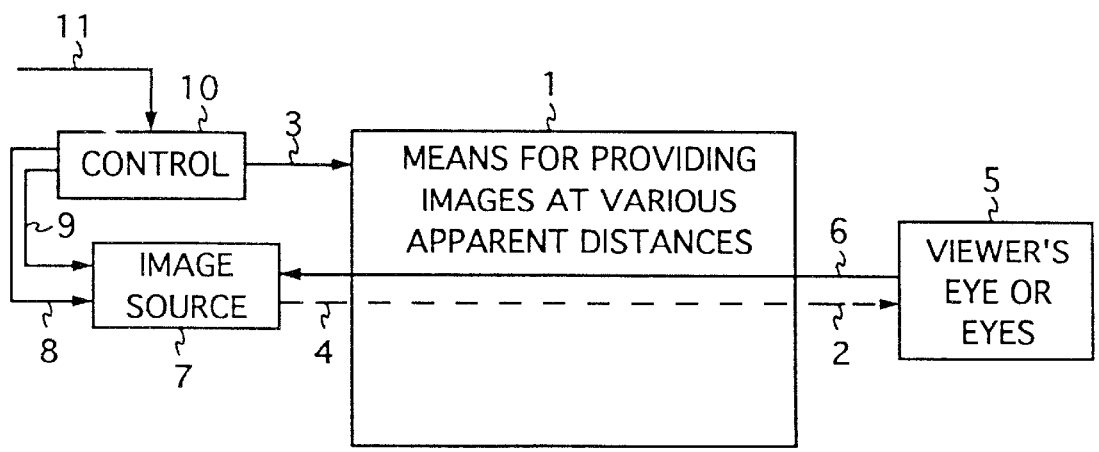
FIG. 1 shows apparatus for providing images at various apparent distances, according to the present invention.

FIG. 1 shows means 1 for providing successive output images 2 at various apparent distances in response to a control signal on a line 3 and successive input images 4, according to the present invention. A viewer's eye or eyes 5 are responsive to the successive output images 2 for viewing 6 same at various apparent distances or magnifications. The means 1 may be a variable magnification lens, mirror or the like. The successive input images may be provided by an image source 7 responsive to an encoded input image signal on a line 8 and a control signal on a line 9. The signals 8, 9 need not be separate but may be combined. The signals on the lines 8, 9 may be provided by a control device 10 in response to such a combined image and control signal on a line 11. Or, the signal on the line 11 may be separate signals as well.

Figure 2:
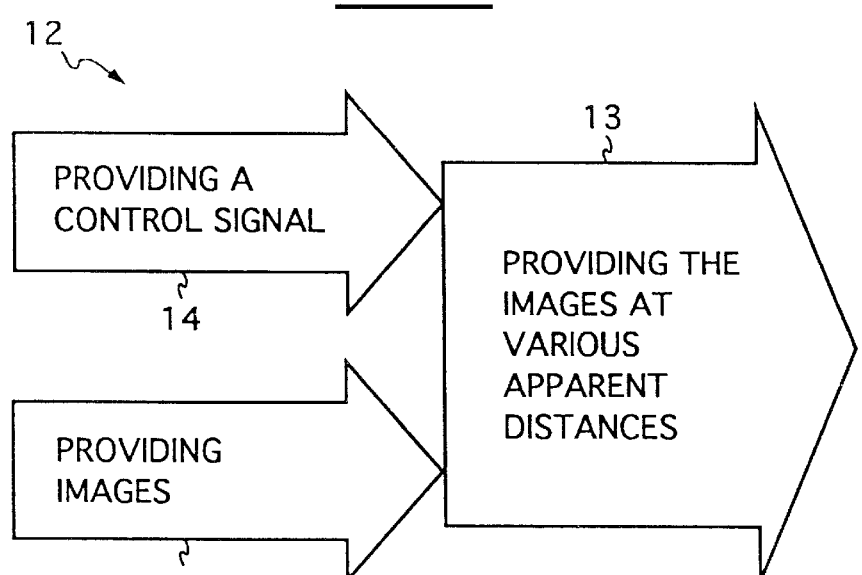
FIG. 2 shows a method for providing images at various apparent distances, according to the present invention.

FIG. 2 shows a method 12 in which a step 13 of providing successive images at various apparent distances in response to a step 14 of providing a control signal and a step 15 of providing the successive images at one apparent distance such as infinity.

Figure 3:
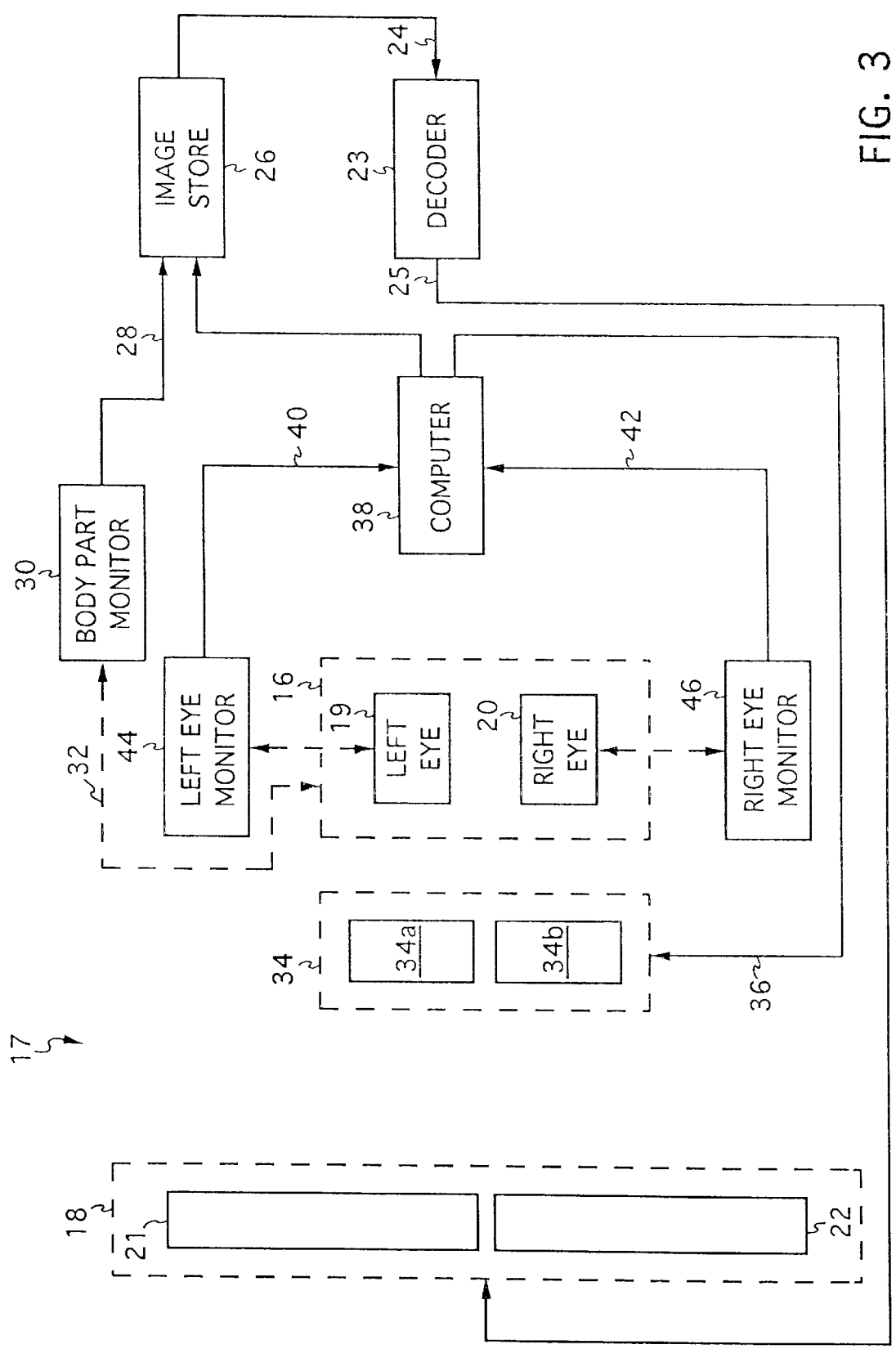
FIG. 3 shows an active viewer in an image space having successive images presented thereto at various apparent distances.

FIG. 3 shows a viewer 16 in an image space 17 having a display 18 for presenting successive images to the viewer's eyes 19, 20. The display 18 may always provide successive images from the same perspective, i.e., nonstereoscopically, or may alternately provide the separate halves of stereopair images. Or, stereopairs may be provided by separate displays 21, 22 for separate halves of the stereopairs, one half for each eye. The display may be provided such as described in the above mentioned U.S. Pat. Nos. 4,515,450 & 4,427,274 or PCT Patent WO 86/01310 in conjunction with, e.g., a pair of light shutter or polarizer glasses (not shown) such as shown in U.S. Pat. No. 4,424,529, or may be provided via image sources in a helmet for mounting on a passive viewer's head in an approach suggested by U.S. Pat. Nos. 4,636,866; 4,968,123; 4,961,626; 4,969,714; 4,310,849; the NASA 3-D Helmet (*Electronic Engineering Times* —Jan. 13, 1986, pp. 1& 22); the Sony Visortron (*Time*, Dec. 28, 1992, p. 11; *Popular Science*, Mar. 1993, p. 26), or many other possible presentation approaches.

A decoder 23 is responsive to an encoded image signal on a line 24 for providing a display signal on a line 25 to the display 18. The encoded image signal on the line 24 may be provided by an image source 26 which may be an image store containing a very large plurality of selectable stored images such as may be consistent with "virtual reality" which may be selected according to a viewer body part monitor signal on a line 28 from a viewer body part monitor 30. Such may be provided as shown in U.S. Pat. Nos. 4,988,981; 5,097,252; 4,937,444; 4,542,291; or Polhemus Navigation Sciences U.S. Pat. Nos. 3,983,474 and 4,017,858 and like patents which are hereby incorporated in their entirety by reference. The body part monitor 30 senses motion of a selected part of the body of the viewer, such as a head or hand, or both, or arm, trunk or leg, as indicated by a sensing line 32 which, in the case of multiple body part monitoring, represents more than one signal.

A variable magnification device 34 is situated in between the viewer 16 and the display 18 and is responsive to a control signal on a line 36 for providing images from the display 18 to the viewer 16 at various apparent distances. The device 34 may be a unitary device or may comprise separate devices 34a, 34b, one situated before each of the viewer's eyes 19, 20, respectively. A computer 38 is responsive to viewer eye monitor signals on lines 40, 42 for providing the control signal on the line 36. The eye monitor signals on the lines 40, 42 are provided, respectively, by left and right monitors 44, 46 which may be oculometer devices such as invented by John Merchant for Honeywell. Such an oculometer is disclosed in U.S. Pat. No. 3,462,604. The left and right eye monitors 44, 46 are responsive to left and right eye 16, 18 movements, respectively. Numerous eye tracking devices, other than oculometers, are generally known in the art of eye tracking and may be found, without limitation, in the U.S. patent literature in class 351/subclasses 6 and 7. An example of another type of eye tracker, based on the detection of Purkinje images, is disclosed in U.S. Pat. No. 3,712,716. Still another example of a type of eye tracker is disclosed in U.S. Pat. No. 4,561,448, based on electro-oculography. The above mentioned eye monitoring patents are hereby incorporated by reference in their entirety. These are examples only and should not be taken as limiting the choice of eye trackers or eye tracking methods, as any type of eye tracking method or apparatus capable of tracking the position of the visual axis of the cameraman's eye is encompassed by the monitor 76. The same applies for the embodiment of the invention shown in FIG. 3 that is for an active viewer.

Figure 4:
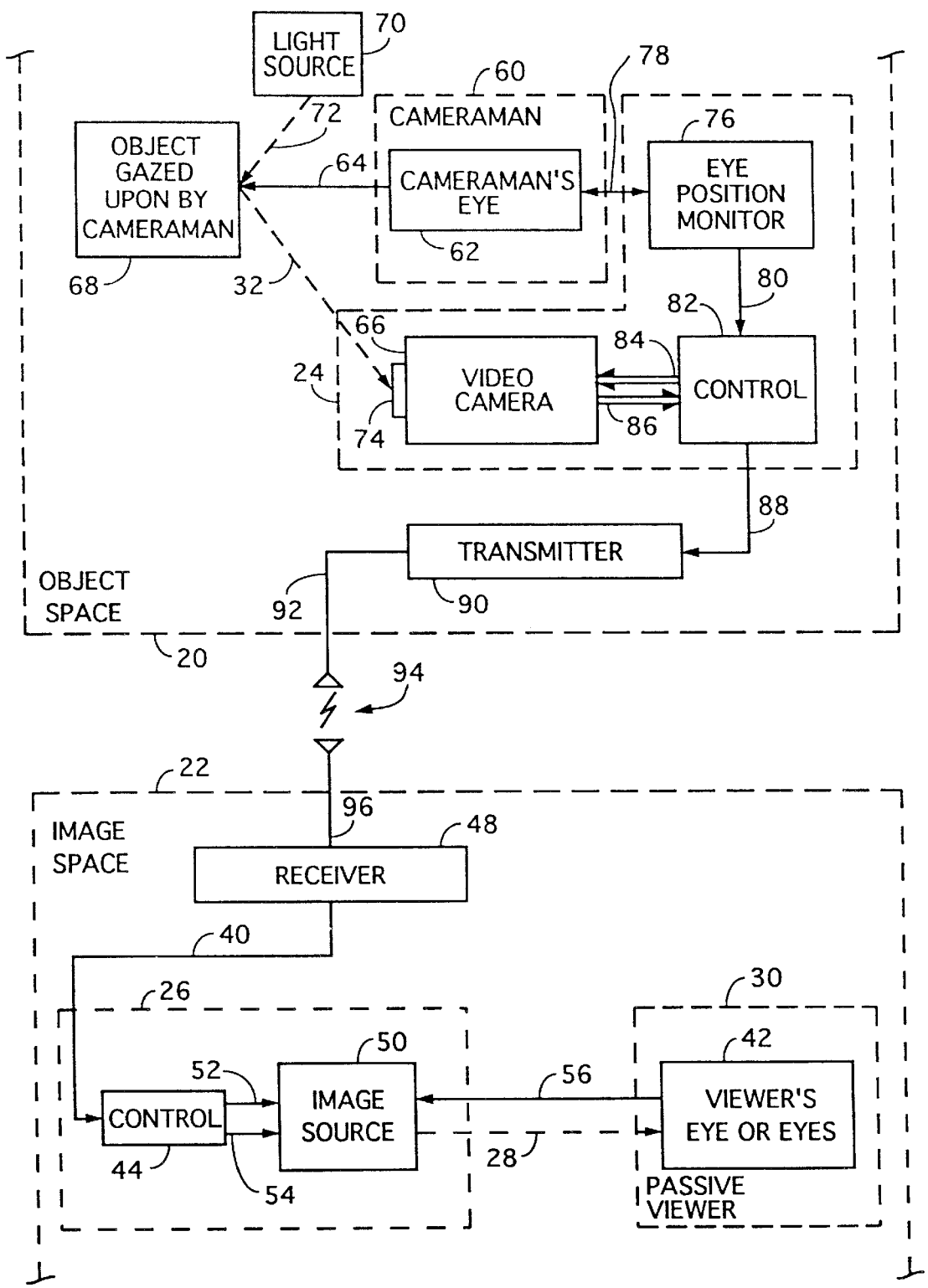
FIG. 4 shows a passive viewer in an image space having successive images presented.

FIG. 4 shows an embodiment of the invention for a passive viewer. The illustration shows an object space 20 and of an image space 22 respectively containing an apparatus 24 and an apparatus 26, each according to the invention disclosed and claimed in co-owned and copending application U.S. Ser. No. 08/1,736, entitled "Passive Virtual Reality," filed on Jan. 7, 1993 which is hereby incorporated in its entirety by reference. The apparatus 24 is located in the object space and is responsive to image signals, e.g., reflected from objects in the object space and, in the above cited copending application, provides mixed image signals for transmission to a storage medium or, as shown without limitation, directly to the image space. For purposes of the present invention, however, the images need not but may be mixed images as defined above. Therefore, unlike the disclosure in the above cited copending application, the image signals disclosed here are not so limited. The apparatus 26 is located for use in the image space 22 and is responsive to image signals from the storage medium or, as shown, directly from the apparatus 24 in the object space for providing successive optical images, also called image signals, as indicated by an image signal on a line 28, to a passive viewer 30. If not mixed image signals, the successive images can be presented with uniform resolution at various apparent distances.

As explained above, however, these may be mixed optical image signals having highly detailed and lesser detailed components mixed together. The highly detailed component is designed to be cast on the fovea of a passive viewer's eye 42 and the lesser detailed component on the remainder of the passive viewer's retina. The mixing of highly detailed and lesser detailed image components lends a certain directionality to the images presented which induces the passive viewer to shift his gaze according to changes in the position of the highly detailed component with respect to the object space imaged or, alternatively, with respect to the lesser detailed component.

The apparatus 26 of FIG. 4 comprises a control 44, responsive to a video signal on a line 40 from a receiver 48, for decoding image information from the video signal and providing the image information in a signal format suitable for presentation by an image display or source 50, as indicated by a signal line 52. A control signal on a line 54 may be used for mixed image applications to change the portion of the object space represented in detail at any given time, i.e., changes the image content of selected successive images and hence the position of the highly detailed component with respect to the lesser detailed component or, alternatively, with respect to the apparent position of the object space imaged by the lesser detailed component, according to changes in the direction of a simulated active eye's visual axis in the object space 20, as decoded from the signal on line 40. Although the signals on lines 40, 52, 54, and many other signals herein are shown as single lines, it should be understood that there may be-more than one signal associated with each.

For mixed image applications, a simulated active eye (not shown) is postulated in the object space, for the teaching purpose of broadly describing an associated simulated visual axis actively moving about in the object space, which the passive viewer may analogously follow with his own visual axis 56 in the image space; the images are presented to the passive viewer's eye 42 in the image space from a perspective which analogously coincides with that of the simulated active eye in the object space. In other words, the position of the center of rotation of the simulated active eye in the object space with respect to the objects "observed" and imaged, corresponds to the position of the center of rotation of the passive viewer's eye in the image space with respect to the images of objects presented thereto. The passive viewer's visual axis analogously follows that of the simulated eye because his visual instinct is naturally drawn to cause the high detail part of the image to be cast on his eye's fovea. Thus, the passive viewer's eye 42 mimics such a simulated active eye. The apparatus 24, according to mixed image embodiments of the present invention, which may be carried out with the devices shown in the object space of FIG. 4, together with a cameraman 60, approximately provide the function of such a simulated eye. The cameraman's eye 62 provides a moving visual axis 64 and a video camera 66 provides a means of capturing images. The camera, for some applications, is of the miniature type which is mounted in a helmet, for the cameraman. The eye 62 is shown directed at an object 68 illuminated by a light source 70, not necessarily localized in the object space. Of course, the object space will have numerous such objects which will successively be engaged by the cameraman's visual attention, over time; merely one such instance is shown. An incident ray 72 is shown impinging on the object 68 and a reflected ray 32 is incident on a lens 74 in the video camera. Numerous similar rays (not shown) combine to form an image of the object in the camera. The cameraman's head may be in close proximity to the apparatus 58 so that the axis 64 in the eye's principal position is more or less parallel to a line normal to the light sensitive surface in the camera. The closer the camera can be placed to the eye 62, the lesser will be the parallax effect caused by the distance therebetween and the closer will the apparatus approximate the postulated simulated eye. An eye position monitor 76 monitors the position of the cameraman's eye 62 by means, for example, of an oculometer, which directs an invisible beam 78 of infrared radiation onto the eye 62 where it is reflected back for detection. An eye position signal, indicative of the direction of the cameraman's visual axis in the object space, is provided on a line 80 to a control 82. The eye position signal 80 is used by the control 82 to control the portion of the object space which will be imaged in a highly detailed manner in the video camera 66 by means of one or more control signals on a line 84.

The camera 66 in turn provides image information over a signal line 86 back to the control 82, where the information is encoded and provided as a video signal on a line 88 to a transmitter 90. It is necessary to point out that the encoding of the video image information into a composite video signal or component signals could as easily be done in the camera 66 itself, rather than the control 82. Similarly, the control function and/or the eye tracking function may be effected within the camera structure also. The transmitter provides a video transmission signal on a transmitting antenna line 92 for transmission to the image space via a broadcast signal line 94. The broadcast signal is detected by a receiving antenna 96 which provides the transmitted video signal to the receiver 48.

It should be pointed out that the video signal ultimately provided on the line 40 to the apparatus 26 may be formed in a manner quite different from that shown in FIG. 4. For example, the object space need not be real and the image signals may be formed by means of traditional or computer animation, without using a cameraman and without monitoring any of his eyes. In that case, the signal on line 40 may not contain image information per se but merely control signals, e.g., for light valves. Similarly, the mixed image signals, if used, may be constructed by means of a computer. Furthermore, the images need not be broadcast. They could be provided in other ways, e.g., via cable or from a video tape by means, for example, of a video cassette recorder (VCR). Thus, they need not be generated and viewed at the same time, as in FIG. 4, but may instead be recorded using a recording medium such as video tape for storing the video signals for later display, e.g., using a video playback device. Thus it will be understood that the apparatus 24 of FIG. 4 is merely shown for the purpose of illustrating one way in which a simulated active eye's images may be constructed and delivered for viewing by a passive eye. Other ways are of course within the scope of-the present invention.

Figure 5:
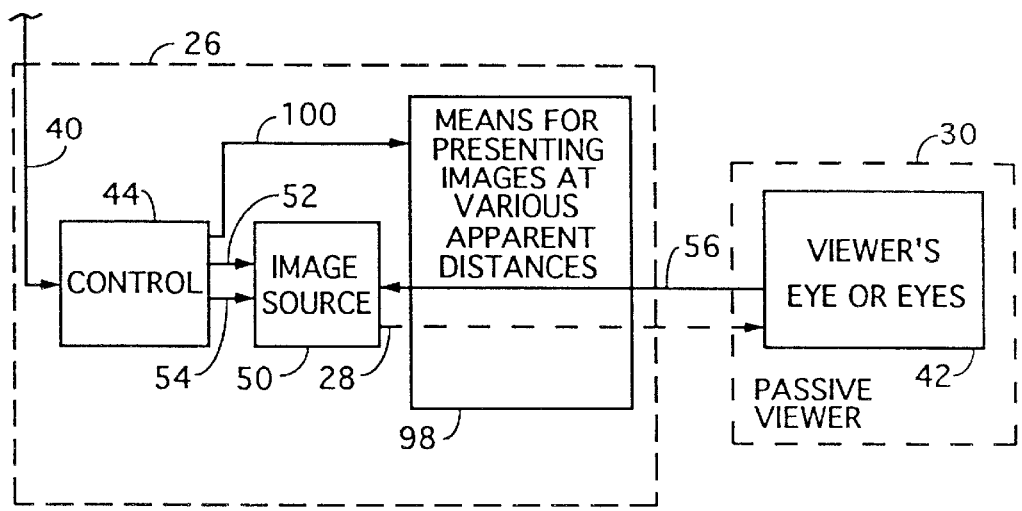
FIG. 5 shows means for presenting images at various apparent distances to a passive viewer.

FIG. 5 illustrates the apparatus 26 of FIG. 4 modified, according to the present invention, to include means 98 for presenting the optical images 28 at various apparent distances, in response to a distance signal on a line 100, indicative of the distance from the cameraman's eye 62 to the object 68.

It is often said (see, for example, U.S. Pat. No. 4,048,653, column 3, lines 9–24) that the brain is relatively insensitive to eye focus as a clue to the distance of objects seen and that one may therefore present an image at any apparent distance, using the size and perspective of objects as clues, although the viewer's eye remains fixedly focused at a screen, for example. It is nevertheless a teaching hereof to show how to present images at distances or apparent distances which correspond to the distances a viewer would normally experience using his accommodative faculty as an observer in a real object space. In other words, the distance or apparent distance of the image presented is changed in a manner which is consistent with the relation between the degree of accommodation in the normal human eye and the distance of real objects viewed. For each of the distances viewable by a normal eye between infinity and the nearest point of distinct vision there will be a corresponding state of accommodation. According to the present invention, this relationship is preserved by presenting images at apparent distances according to that relationship or one akin to it.

Figure 6:
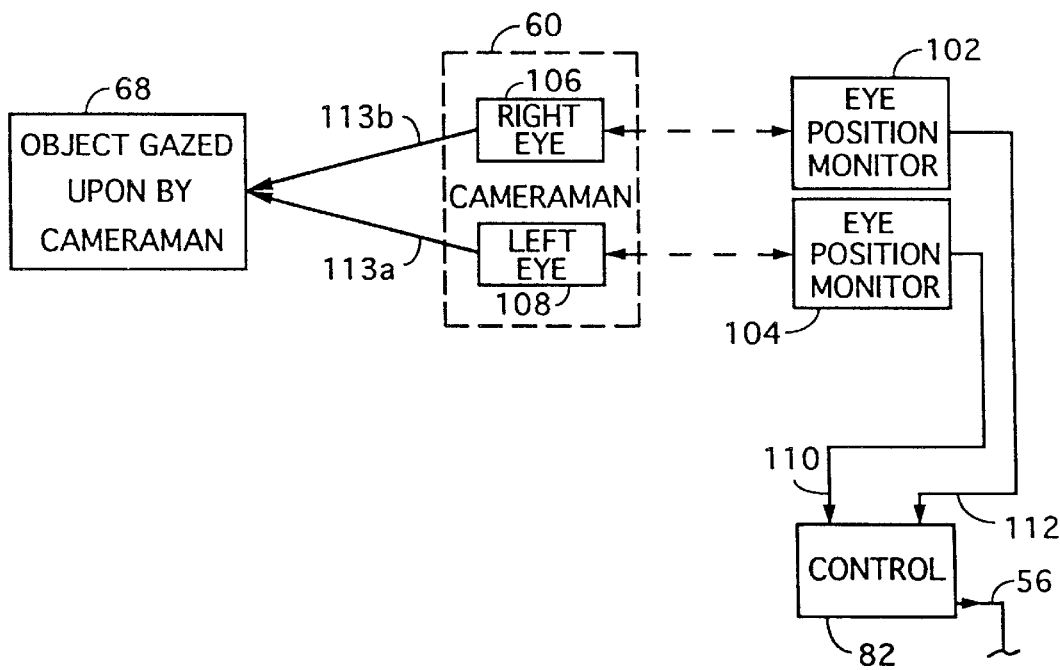
FIG. 6 shows a pair of eye position monitors for monitoring a cameraman's eyes for enabling selection of the apparent distances for the images to be presented to a passive viewer.

The distance signal on the line 100 is derived from distance information encoded in the video signal on the line 40. The distance information may, without limitation, be obtained in the object space by monitoring both of the cameraman's eyes. For example, in FIG. 6 there are illustrated two eye position monitors 102, 104, one for each of the cameraman's eyes 106, 108. The control 82 is responsive to a pair of signals on lines 110, 112 indicative, respectively, of the separate directions 113a, 113b of the left and right eyes 106, 108 of the cameraman 60. A determination is made by the control 82 of the distance between the cameraman 60 and the object 68 based on the angle between the left and right visual axes at their point of intersection and the known interocular distance. (The control 82 may provide a lens control signal (not shown) for controlling the magnification of the lens 74 but such is not essential). The refractive state of the eyes may be monitored using an objective refractor such as the 6600 Auto-Refractor made by Acuity Systems and described in U.S. Pat. No. 4,190,332. In such a case, the other eye would not necessarily have to be monitored since the assumption could be made that both eyes approximately are at the same accommodation level. There are of course many other range finding techniques which may be usefully employed for the same purpose.

The means 34 of FIG. 3 and the means 98 of FIG. 5 may, without limitation, be a variable magnification lens or a combination of lenses, such as any of the various types disclosed in the literature. The fact that FIGS. 3 & 5 show the optical images from the displays 18, 50 passing through the means 34, 98 does not exclude, as an alternative, reflection of the images off of a surface for reflective viewing. Thus, the means 34, 98 may, also without limitation, be a variable focus mirror, such as disclosed in U.S. Pat. No. 3,493,290. Another example of such a mirror may be found in an article by Eric G. Rawson entitled "3-D Computer-Generated Movies Using a Varifocal Mirror," *Applied Optics*, Aug. 1968, Vol. 7, No. 8, pp. 1505–12. Of course, some of the devices mentioned above utilize various combinations of reflection and refraction.

It should thus be understood that the approach selected for the variable magnification means 34, 98 of FIGS. 3 & 5 may be taken from a wide variety of possible approaches. These may also include liquid lenses with refractive properties that change according to changes in the volume of liquid between one or more movable or flexible surfaces of such lenses. See, for example, U.S. Pat. No. 4,289,379 to Michelet which discloses a principle which may utilized for a variable magnification lens. As shown below, these may also include optically transparent elastomers such as invented for Battelle Development Corp. by Markham and Mueller as disclosed in U.S. Pat. No. 4,603,158 used, according to the present invention, as a variable magnification lens. For an example, see FIGS. 26–35 of copending application Ser. No. 08/1,736 which are hereby incorporated by reference along with the accompanying text beginning at line 11 at page 70 through page 72, line 2. Therefore, the specific approaches described herein should be understood as being merely incidental choices and not in any way limiting the central core idea, as expressed in several of the dependent claims, of presenting the successive images to a viewer at various apparent distances according to the intersection of the viewer's visual axes.

The displays 18, 50 may be a cathode ray tube (CRT) display but other types of displays may be used equivalently. These include but are not limited to the various types of electroluminescent (EL), gas discharge, liquid crystal (LC), ferroelectric, electrochromic, electrophoretic, vacuum fluorescent, thin-film transistor (TFT), silicon switches, semiconductor switches with capacitors, metal-insulator-metal (MIM), combinations of the foregoing, or any of the other emerging display technologies presently being developed or to be developed which are reasonably within the scope of the claims of this patent during the term hereof.

The human visual apparatus is frequently engaged in the acquisition of detailed binocular near object information. The fusion reflex directs the eyes' visual axes so that a near object of regard is simultaneously imaged on both foveae. The closest point in the median plane to which the eyes can converge is the near-point of convergence which varies among normal individuals between 40 to 160 mm from the corneal plane.

The angle of convergence (C) for a near object is usually measured in prism diopters according to the approximate relation C=−Q×PD, where Q is the inverse of the distance (q) of the object (in meters) and PD is the interocular distance (in cm). (A prism diopter (Δ) is a unit for measuring deviation. One prism diopter is that strength of prism that will deflect a ray of light 1 cm at a distance of 1 meter. The deflection is toward the base of the prism. Another commonly used unit, a degree (°), equals about 2Δ). For example, given that q =−250 mm and the PD is 60 mm, C=4×6=24 diopters. Accommodation is measured in diopters, i.e., the inverse of the distance in meters from the eye. The range of accommodation is the linear distance from the far point to the near point. For example, an eye with 8D of accommodation has a near point of −⅛ meter or −125 mm, so its range is from infinity to −125 mm.

There is a known relation between accommodation and convergence as the object of regard approaches the eye. The required convergence is normally shown plotted in prism diopters for various interocular distances which vary significantly between-persons.

Various stereoscopic viewing techniques and devices are known. These range from the well known Wheatstone, Brewster and Brewster-Holmes stereoscopes to the lesser known Asher-Law stereoscope. Various types of Synoptophores (a much modified Wheatstone stereoscope) are also known, as is the variable prism stereoscope (using rotary or Risley prisms). The devices 18, 34 of FIG. 3 and the devices 50, 98 of FIG. 5 are together amenable for use as any of the aforementioned stereoscopic viewing devices, without limitation, for presenting separate monocular fields as stereofields or stereopairs so as to present corresponding points accurately and, if desired, to preserve a normal relationship between accommodation and convergence in a viewer.

Figure 8:
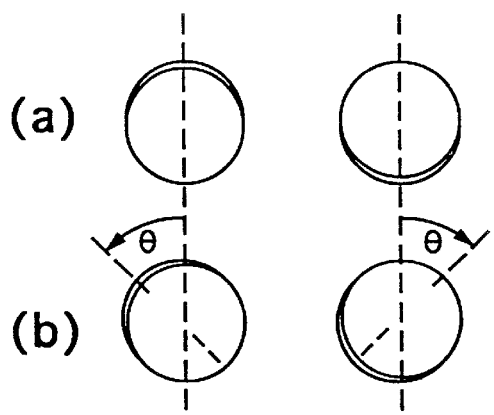
FIG. 8 shows a pair of known Risley prisms which may be used in a new way, according to the present invention.
Figure 7:
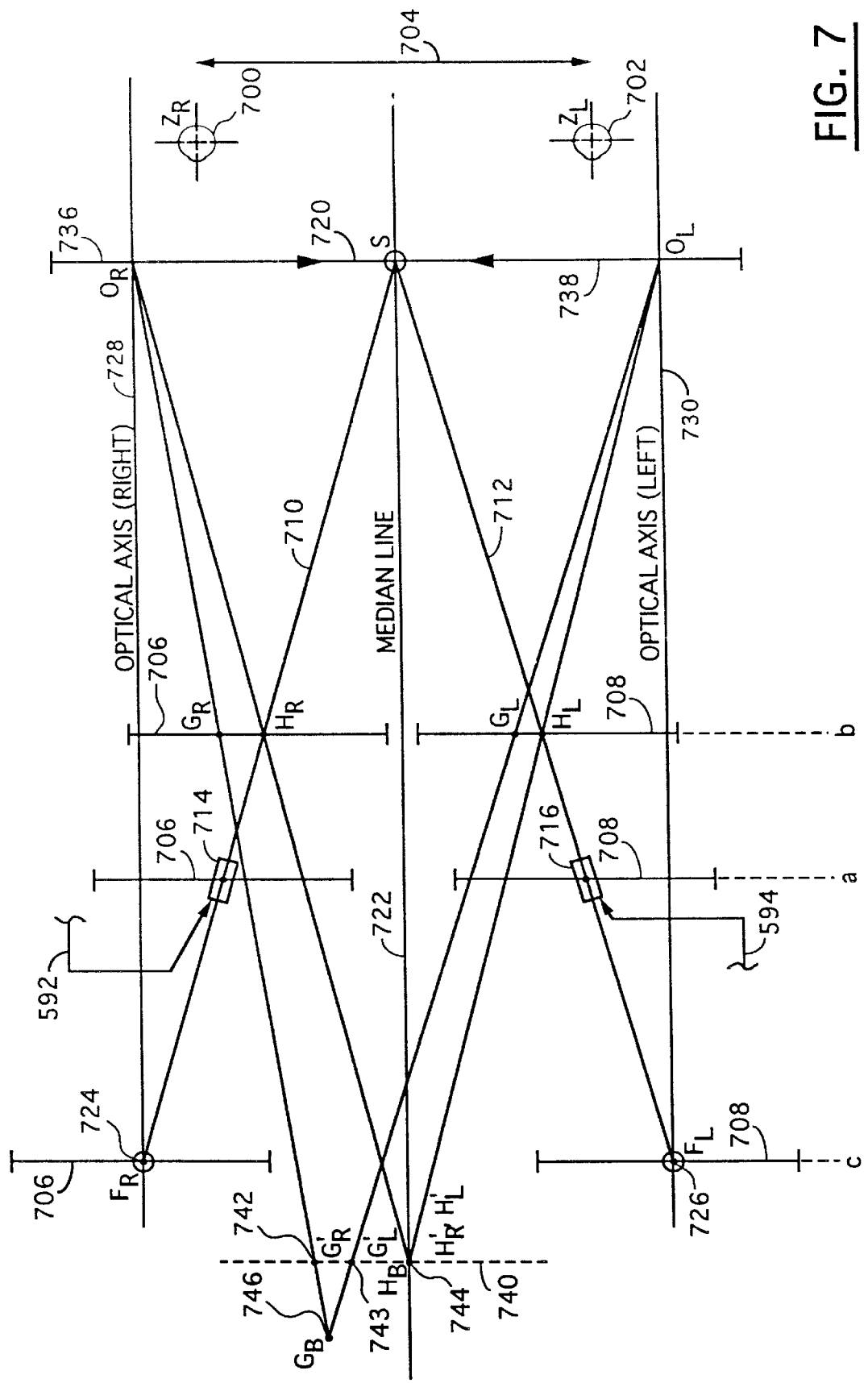
FIG. 7 is an illustration of a Brewster-Holmes stereoscope adapted for presenting successive images in a manner which provides for a substantially constant accommodation/convergence ratio, according to the present invention.
Figure 9:
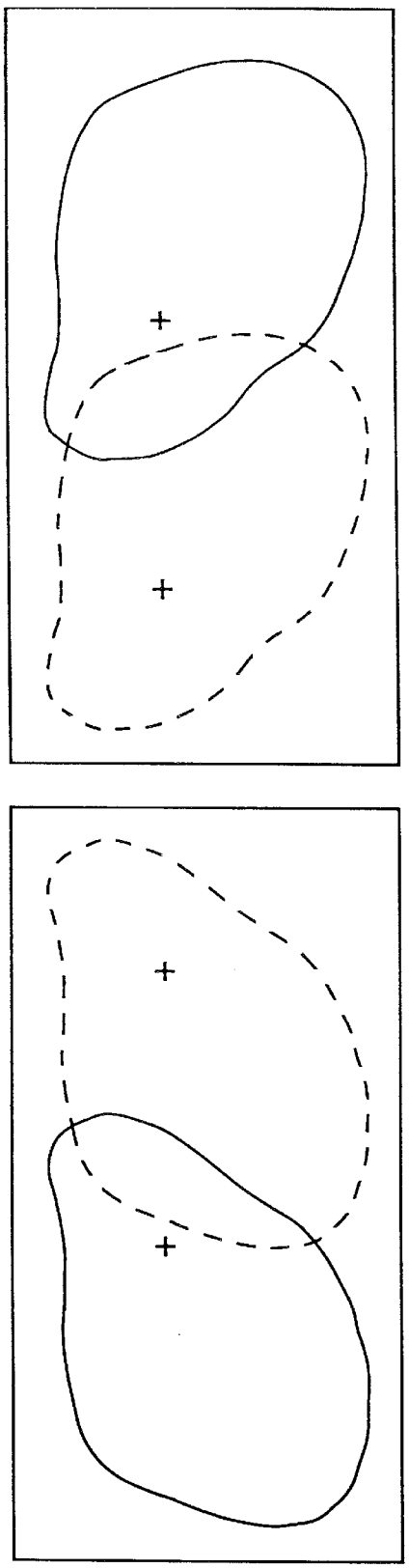
FIG. 9 shows a pair of oversized displays, according to the present invention.

This may be achieved in any of the stereoscopes described, or others, using the basic idea of the Asher-Law stereoscope or variations thereof as taught in connection with FIG. 7. The basic idea of the Asher-Law stereoscope is to control the convergence/accommodation ratio by separating the two halves of the stereopair, mounting each half on its own adjustably angled rail and varying their separation to a predetermined degree as the viewing distance, which can be kept the same for each eye, is altered. It should be understood that although this principle will be described in detail in connection with the stereoscope of FIG. 7, there are many other approaches for achieving the same end. For example, instead of altering the distance of the stereopair from the passive viewer's eyes, a variable magnification lens or a Risley (rotary) prism as shown in FIG. 8 could be employed to the same end with either lateral displacement of the two halves of the stereopair only or rotatable mirrors to effect lateral displacement of the images thereof. Lateral displacement could also be effected wholly electronically, for example, by providing an oversized matrix display as shown in FIG. 9 and only utilizing a portion-of the display surface at any given time. Images may then be shifted left or right by varying amounts to provide the required lateral displacement. Similarly, according to the teachings hereof, all of the other types of stereoscopes are adaptable to control the accommodation/convergence ratio and the claims of the present invention embraces all such techniques for achieving the same end in connection with the disclosed means and method for presenting successive images at various apparent devices.

The known variable prism stereoscope incorporates two Risley prisms, so geared that equal amounts of base-in or base-out prism can be placed before each eye. A total of 60 prism diopters is thus available. A septum is usually positioned so as to prevent either eye from seeing the opposite half of the stereogram but, according to the present invention, this may be handled by means of light valves for each eye as known for stereo TV. Also, to permit a normal relation between accommodation and convergence, a base-out prism should be placed before each eye. Otherwise, instead of converging to a point in the plane of the surface of the stereogram, each eye might have to diverge in order to fixate a pair of corresponding points. If, for example, the separation of these points is 7 cm and the viewing distance is ⅓ m, the total base-out prism required is 21 prism diopters.

Referring back to FIG. 7 (not to scale), a viewer's eyes 700, 702 are separated by an interocular distance 704 and are presented with a stereopair 706, 708, shown in three separate arbitrary positions (a,b,c), each half of the stereopair mounted on an angled rail 710, 712 for movement thereon via a pair of sleds 714, 716 controlled by a corresponding pair of, control signals 592, 594 similar to the signal on the line 36 from the computer 38 of FIG. 1. Each half of the stereopair is presented to a corresponding eye of the passive viewer through a fixed lens, e.g., a centeted collimating lens (Brewster's lenticular stereoscope or a decentered (outwards) sphero-prism (Brewster-Holmes stereoscope), the right eye 700 being presented with the right half 706 and the left eye 702 being presented with the left half 708. Each rail coincides with a line drawn from the intersection of the lens plane 720 with a median line 722 to each focal point 724, 726 on the respective optical axes 728, 730.

If the convergence/accommodation ratio is to be kept approximately fixed at its normal value of one half the interocular distance regardless of the distance of the stereopair from the lens plane, both right and left halves of the stereopair must be imaged on the median line or at equal distances to the same side of it. Thus, for a position of the stereopair at b where the points (GR,GL) and (HR,HL) are two pairs of corresponding points, GR and HR are imaged by the right lens 736 in an image plane 740 at points 742, 744, respectively, while GL and HL are imaged by the left lens 738, at points 743, 744, respectively. Rays are shown graphically from the optical center of each lens through the two pairs of corresponding points and on to the image plane. It will be noted that the normal convergence/accommodation ratio is preserved for the fixation point 744 while it will be correct also for a fixation point 746 if certain other conditions relating to the verisimilitude of perspective are met. I.e., the correct angular relationship may be maintained by making the lateral separation of the cameras equal to that of the passive viewer's interocular distance and ensuring that the magnification (m) of the images satisfy the relation m=focal length of stereoscope lens/focal length of camera lens. A third position (c) of the stereopair is shown for the case of a distant object.

In further accord with this aspect of the present invention, the rails of FIG. 7 may be eliminated by using a variable magnification lens of any type in conjunction with an oversized matrix display such as shown in FIG. 9 or by use of the pair of base-out Risley prisms such as shown in FIG. 8. By simply shifting the positions of the left and right fields of view on an oversized display matrix such as shown in FIG. 9 or by varying the deflection power of a pair of Risley prisms as shown in FIG. 8, the Asher-Law accommodation-convergence preservative effect may be achieved using means other than the sleds of FIG. 7.

Figure 10:
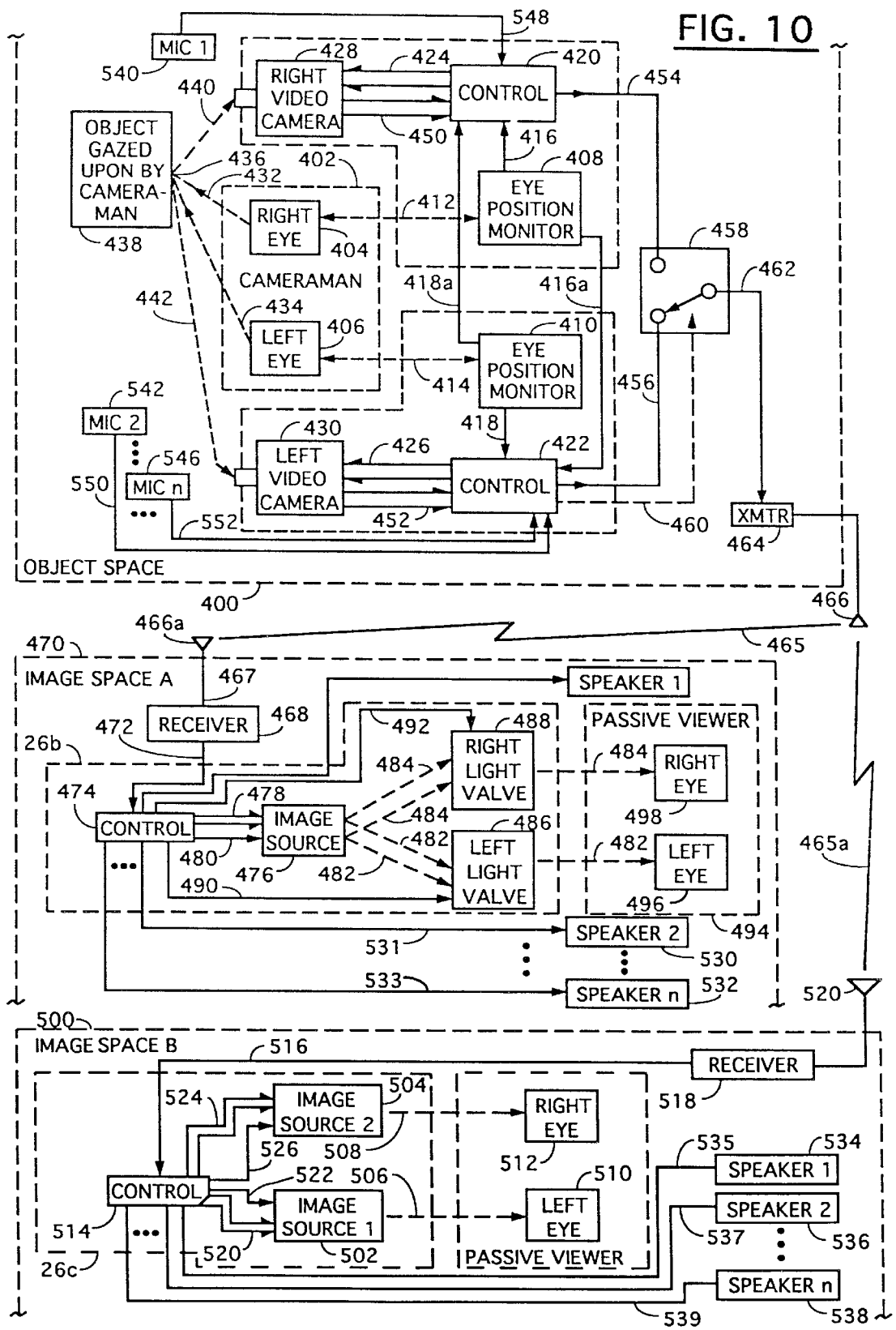
FIG. 10 shows a stereoscopic embodiment of the present invention for a passive viewer.

Referring now to FIG. 10, a stereoscopic camera and two stereoscopic display embodiments of the present invention are there illustrated. An object space 400 contains a cameraman 402 having a right eye 404 and a left eye 406 which are respectively monitored for position by eye position monitors 408, 410 via signal lines 412, 414, each of which may represent more than one signal, e.g., both an infrared illumination beam and an infrared reflection beam, the reflection beam having a magnitude indicative of the monitored eye's angular position. Each eye position monitor provides at least one eye position signal 416, 418 to respective control units 420, 422, which in turn provide scanning control signal lines 424, 426 to respective video cameras 428, 430. The eye position monitors may measure one or more axes of rotation of the eye, i.e., both horizontal and vertical ductions and torsions as well. If torsions are not measured they can be computed or looked up, if desired, based on the point of convergence and torsions that can be predicted according to average human behavior, as stored in a lookup table. The cameraman is, at any given point in time, viewing particular objects within the object space and his visual axes 432, 434 are shown at such a moment in FIG. 10 directed so as to intersect at a point 436 on such an object 438. There will generally be a source of illumination-in the object space (not shown) to which the cameras 428, 430 will be sensitive and which will illuminate the objects in the object space, including the point 436, so as to reflect light to the cameras as shown, for example, by light rays or image signals 440, 442. The image information borne by such light rays is encoded in the cameras. This information may be encoded uniformly or nonuniformly either by electromechanically rotated optical means or electronically by a suitable encodement method. For nonuniform encodement a nonuniform lens may be used (see, e.g., U.S. Pat. No. 3,953,111) or a nonuniform scanning technique may be used (see, e.g., copending application Ser. No. 08/1,736 in conjunction with FIGS. 7(*a*), 7(*b*), 8–12, 13(*a*)–(*c*), and 14 thereof beginning at page 29, line 3 up to page 51, line 14 which is hereby incorporated herein by reference).

There will of course be a very large number of reflected light rays, other than rays 440, 442 entering each of the cameras from the various points and objects within the object space. If, for example, the cameras of FIG. 10 use electronic raster scanning of a light sensitive surface as the encodement technique, for a nonuniform resolution embodiment, there will be a small number of rays in the vicinity of each of the rays 440, 442 which will be cast on correspondingly small areas on each of the respective light sensitive surfaces. These bundles of rays correspond to a field of view of a few seconds of arc, from the point of view of the cameraman along lines 432, 434. Both of these small areas will be scanned finely in the respective cameras while all of the remainder of the light sensitive surfaces, excited by the remainder of the rays surrounding the small bundles from all points within the cameraman's field of view, will be scanned coarsely. It should be understood that some nonuniform resolution embodiments (not only stereoscopic embodiments) may have more than just a few seconds of arc scanned finely. Some such embodiments may finely scan on the order of minutes or even degrees. In any event, the control signals 424, 426 will control the instantaneous positioning of the finely scanned areas on the respective light sensitive surfaces, according to changes in the directions of the visual axes 432, 434 of the cameraman's eyes. For example, each of the light sensitive surfaces may be laid out in a Cartesian coordinate fashion and each of the control signals 424, 426 will then contain x and y coordinate information. The optical image corresponding to the scene viewed can be thought of as being cast on such a coordinate system such that the positive y direction corresponds to "up" in the scene and positive x to "right." In that case, if the cameraman is gazing at a near object straight ahead and above horizontal, then the signal on the line 426 will cause the fine scan in the left camera to be located in the first quadrant of its light sensitive surface and the signal on the line 424 will cause the fine scan in the right camera to be located in the second quadrant of its light sensitive surface. A change in the cameraman's gaze toward a near object to the far right of the scene below horizontal will cause the fine scan in the left camera to move from quadrant one to quadrant four and the fine scan in the right camera to move from quadrant two to quadrant four.

Each of the cameras 428, 430 provides a video signal, respectively, on lines 450, 452 to the control units 420, 422, where the image information is formatted, without limitation, into composite video signals on lines 454, 456, respectively. Of course, other encodement techniques are equally acceptable, e.g., separate component video signals for carrying information separately relating to deflection, intensity, etc. A switch 458 is controlled by a signal line 460 from the control unit 422 (or control unit 420) to alternate between signal lines 454 and 456 in order to provide each signal alternately on a line 462 to a transmitter 464 for transmission of a broadcast signal on a line 465 via an antenna 466.

The timing of the alternations of switch 458 may be selected so as to provide a left field, frame or portion thereof and then a right counterpart.

An antenna 466*a* is responsive to the broadcast signal on the line 465 and provides a sensed signal on a line 467 to a receiver 468 in an Image Space A 470 which provides a received signal on a line 472 to a control 474 within an apparatus 26*b*. The control 474 strips off synchronizing signals from the composite video signal on the line 472 and provides one or more synchronizing signals, e.g., horizontal and vertical, for the deflection system of an image source 476, as signified by a plurality of synchronizing signals on a line 478. The image information is provided on a signal line 480 to the image source 476 which provides alternate left and right eye images as signified by bundles of image signal lines 482, 484, respectively provided to left and right light valves 486, 488. These are in turn controlled by signal lines 490, 492 from the control 474. The left light valve 486 is controlled by signal line 490 to transmit images on lines 482 when the left eye images are presented by image source 476 but to block images on lines 482 when right eye images are presented. Similarly, the right light valve 488 is controlled by signal line 492 to transmit images on lines 484 when the right eye images are presented by image source 476 but to block images on lines 484 when left eye images are presented. A passive viewer 494 may be responsive with a left eye 490 to the transmitted left eye images on lines 482 and with a right eye 498 to the transmitted right eye images on lines 484.

Light valves are not required for an apparatus 26*c* in Image Space B 500 because two separate image sources 502, 504 provide separate left and right eye images on image lines 506, 508, respectively, provided separately to a passive viewer's left and right eyes 510, 512. A control 514 is responsive to a composite video signal on a line 516 from a receiver 518 supplied by an antenna 520 responsive to a broadcast signal on a line 465*a* which may be similar to or identical with the signal broadcast on the line 465. The control alternately provides synchronizing and left eye image information signals, respectively, on lines 520, 522, and synchronizing and right eye image information signals, respectively, on lines 524, 526 to the respective image sources 502, 504.

It should be understood that although the apparatus 26c of Image Space B 500 is illustrated as responsive to a single composite video signal which is multiplexed between the two separate image sources 502, 504, so that each source provides images for only half the time, there could as easily be a system which provides two separate composite video signals, one for each image source, so that each source provides images all the time. A dual CRT system which requires two separate video signals which are each always active is shown, for example, in U.S. Pat. No. 4,310,849.

Both image spaces may be provided with a number of speakers 530, . . . , 532 energized by audio signal lines 531, . . . , 533 in Image Space A and speakers 534, 536, . . . , 538 in Image Space B energized by audio signals on lines 535, 537, . . . , 539. These speakers are arranged about the head of a passive viewer to simulate sounds "heard" by the simulated active viewer in the object space. A passive viewer may have six separate speakers arranged symmetrically about his head. Three are arranged in a horizontal circle separated from one another by 120 degrees. The speakers may be mounted, along with the display, in a helmet for mounting on the passive viewer's head or may be mounted on external supports independent of the viewer. Three others are arranged in a vertical circle, also separated by 120 degrees. Microphones 540, 542, . . . , 546 are similarly arranged about the head of the cameraman in the object space 400 and pick up sounds for transmission over signal lines 548, 550, . . . , 552 to the control units 420, 422 for inclusion in the composite video signals on the lines 454, 456 in much the same way as conventional television, except on six channels. These may of course be multiplexed into a single channel or more. Of course, a similar approach may be taken for the active viewer of FIG. 3.

Figure 11:
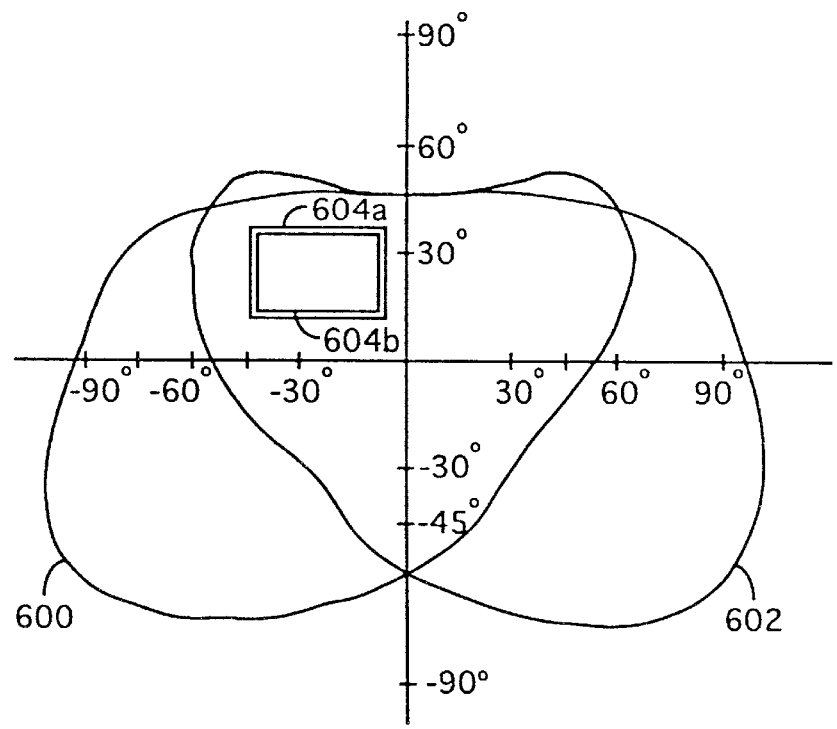
FIG. 11 shows left and right eye images overlapped as viewed by an active or passive viewer and which may include lesser and more detailed portions, according to the present invention.

FIG. 11 is an illustration of the manner in which the images presented to the viewer may be provided so as to match the fields of view of the viewer's eyes in the image space; they are arranged so as to overlap, according to the present invention. A left field of view 600 roughly corresponds to the field of view of the eye 19 of FIG. 3 or the eye 496 or the eye 510 of FIG. 10, while a right field of view 602 roughly corresponds to the field of view of the eye 20, 498, or 512. The median line of the viewer's eyes perpendicularly intersects the origin of the coordinate system illustrated in FIG. 11. The left display may provide a coarse resolution image over the entire field of view 600 from a left eyed perspective and the right display may provide a coarse resolution image over the entire field of view 602 from a right eyed perspective. Depending on the instantaneous magnitudes of the signals on the lines 40, 42 in the image space of FIG. 3, for example, each of the respective displays 21, 22 will provide a fine resolution image over a small section of the fields of view 600, 602. These two small areas 604a, 604b will themselves overlap so as to be in registration, for example, for viewing by each successive fixation of the viewer's eyes 16, 18. For example, if the viewer's instantaneous gaze is directed to a point of regard to his upper left, then the left display will provide, e.g., the small area 604a in the top center of the field of view 600 while the right display will provide the small area 604b to the top left of field of view 602 as shown in FIG. 11. Although the small area 604a is shown as slightly larger than the small area 604b in FIG. 11, it will be understood that this was done for illustrative purposes only, in order to enable the reader to distinguish the two overlapping areas in the drawing. The shape of the fine resolution areas 604a, 604b need not be rectangular but may assume any appropriate shape such as circular, elliptical, square, etc. Similarly, the boundaries between fine and coarse areas need not be as abrupt as is suggested but may instead fall off gradually from very high resolution in the center of the high resolution area to lesser resolution with increasing distance from the center, as in the human retina. Of course, for rapidly changing saccades it will be understood that the two areas may not always instantaneously overlap, but will try to "catch up" with one another when the "target" is acquired and the eyes come to "rest." It should be realized that the viewer's eyes will be capable of moving with high velocity saccades, i.e., up to nine hundred degrees per second and that there will be 3 or 4 saccades per second, each lasting about 20–30 milliseconds with intermovement fixation times lasting about 200–400 milliseconds. Most saccades span less than fifteen degrees, however, and infrequently reach speeds above four hundred degrees per second. The larger angular velocities are usually associated with the larger angular shifts. It is unlikely for successive saccades to occur in less than 150 ms since it takes about 50 ms to "program" the next one during a fixation; 20–30 ms to execute; 50 ms to regain clear acuity; and a minimum of 50 ms to acquire a new visual scene for assessment, interpretation and integration with previous scenes. Although FIG. 11 shows a binocular field of vision covering about 105 degrees in a heart shape or an inverted pear shape, it will be understood by those skilled in the art of clinical optics that conjugate version movements of the eyes are only possible over a range of approximately 45 degrees from either side of the primary position. This is the binocular field of fixation, i.e., the region of space containing all points which may be fixated by the mobile eyes, assuming the head remains stationary. It will also be understood that the relative size of the highly detailed image areas in FIG. 11 with respect to that of the lesser detailed area is much larger than it should be if one were trying to faithfully imitate the actual relationship between the area covered by the fovea, or even the macula, with respect to the rest of the retina since the fovea only takes a few seconds of arc. It should be understood that the relative sizes selected for the different areas is a design choice and is not of particular significance for the purposes of determining the scope of the claimed invention. Such mixed images may be provided in analog or digital fashion as described in copending application Ser. No. 08/1,736 in connection with FIGS. 7(a), 7(b), 8–12, 13(a)–(c), and 14, as described above. See also U.S. Pat. No. 4, 513, 317 for details of an analog scanning technique, particularly at FIGS. 2, 3 and 4; but which is hereby incorporated by reference in its entirety.

It should also be understood that although FIG. 11 was described above in connection with the "active" viewer of FIG. 3, as previously explained, mixed images may also be used for the "passive" viewer of FIGS. 4 & 10 to help stabilize the shifting wide view images shown by guiding, with a narrow view, the viewer's eyes in relation to the observer's head movements. It should also be understood that, for an active viewer embodiment, the images may be of uniform resolution.

It should also be understood that for nonuniform resolution embodiments, the highly detailed areas 604a, 604b may move jointly with their associated lesser detailed areas 600, 602 or may move independently thereof. The former approach is a closer simulation of the human visual process. If torsions are simulated, for the former approach, both the highly detailed and lesser detailed image areas are rotated jointly; for the latter, they may be rotated jointly but need not be.

Figure 12:
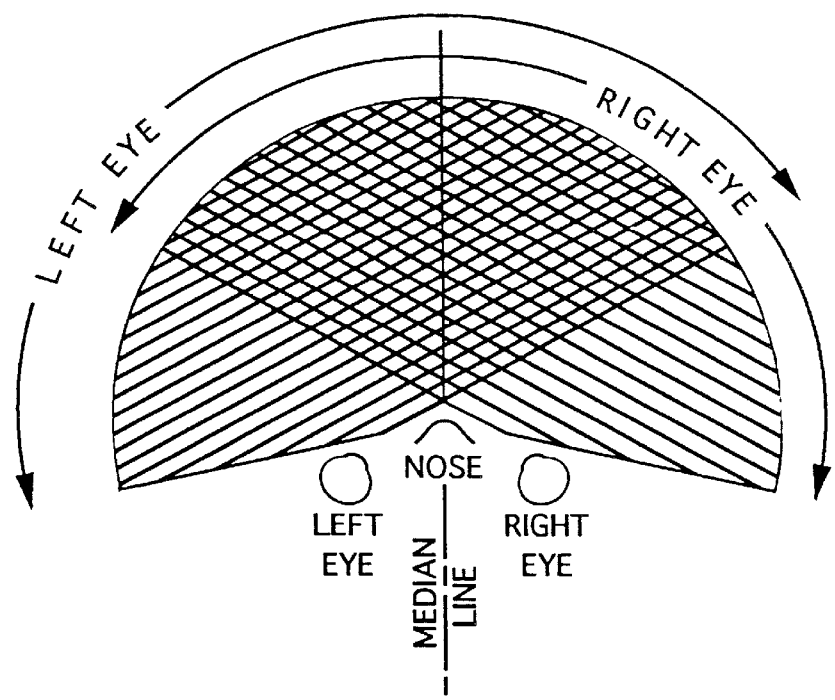
FIG. 12 shows the overlap of the fields of view of an active or passive viewer, according to the present invention.

FIG. 12 illustrates the horizontal field as seen from above. The cross-hatched area represents the binocular field of view. The extent of each of the monocular fields of view is shown. A pair of viewer eyes are illustrated, one on either side of the median line which, as mentioned above, perpendicularly intersects the origin of the coordinate system of FIG. 11. It will be observed that the monocular centers of projection are to be distinguished from the binocular sighting center.

In life, each of the monocular fields 600, 602 of FIG. 11 is bounded by the superior and inferior margins of the orbit, the nose, and on the temporal side by the projection of the edge of the retina (the ora serrata; this extends furthest forward in the eye of the nasal side). Accordingly, as shown in FIG. 12, each monocular field extends horizontally to about 60 degrees nasally and 100 degrees temporally.

Whenever both foveae are stimulated simultaneously, the stimuli are perceived as having a common origin in space. A similar correspondence exists between the great multitude of other pairs of retinal receptors, called corresponding points which, when stimulated in binocular vision, also give rise to a sensation subjectively localized at a single point. For a given position of the eyes, the locus of all the object points whose images fall on corresponding points is known as a horopter, generally a curved surface. The longitudinal horopter is the line formed by intersection of the horopter with the plane containing the eyes' centers of rotation and the fixation point.

Students of the eye often make use of an imaginary organ called the binoculus or cyclopean eye as an aid for understanding the projection of images in binocular vision. If the longitudinal horopter is made a part of a circle passing through the point of fixation and the eyes' nodal points, the nodal point of the cyclopean eye should be placed on this circle equidistant from the left and right eyes' nodal points. When a point on the left retina is stimulated, it is conceived as stimulating a point on the cyclopean retina at the same distance and in the same direction from its fovea. The same applies to a point on the right retina. If the right and left receptors under consideration are corresponding points, they coincide when transferred to the cyclopean eye where they are said to give rise to a single percept by projection through the cyclopean nodal point. The positioning and overlapping of the monocular fields 600, 602 (each field presented only to one of the viewer's eyes) of FIG. 11 and the registration of the high detail image areas 604a, 604b are carried out such that a cyclopean eye positioned with its primary line perpendicular to the plane of FIG. 11 and intersecting the origin of the illustrated coordinate system would have all of the points within the overlapping portions of the fields 600, 602 perceived as corresponding pairs of points.

Figure 13:
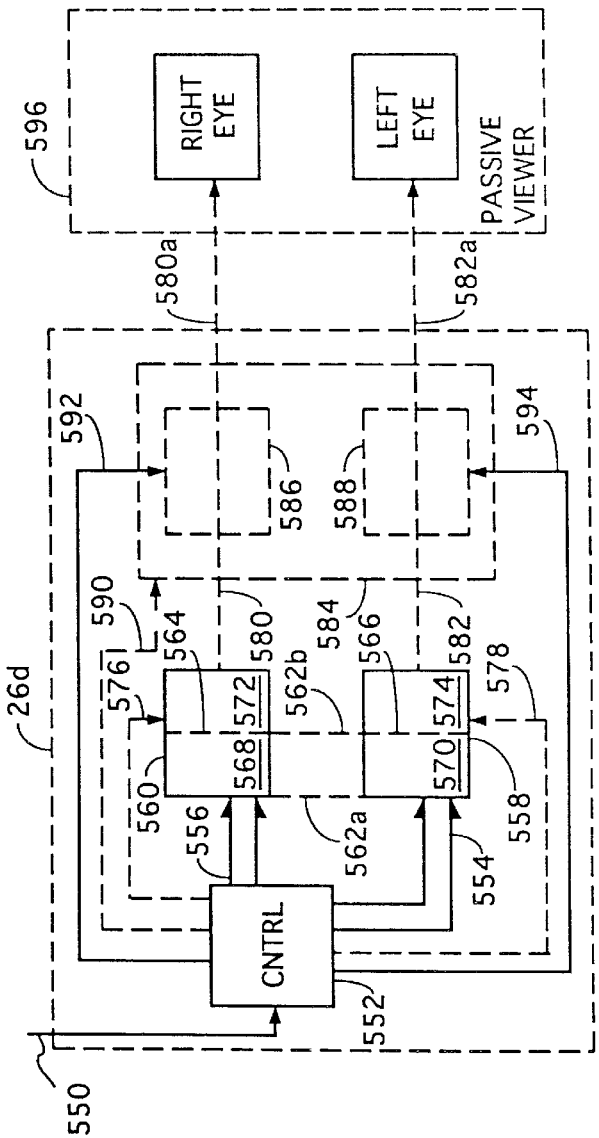
FIG. 13 shows a stereoscopic variable magnification device for use in a device of FIG. 10, according to the present invention.

FIG. 13 is an illustration of an apparatus 26d, according to the present invention, which apparatus may be similar to the apparatus 98 of FIG. 5 or the apparatus 34 of FIG. 3 except that it contains means for presenting images at various apparent distances. A composite video signal on a line 550, which may be similar to either the signal on line 472 in Image Space A or on line 516 in Image Space B of FIG. 10, is provided to a control unit 552, which may be similar to the control 474 or 514 of FIG. 10. The control unit 552 provides a number of left eye signals including synchronizing and image information signals on a multiple signal line 554 to a left eye image source 558 (solid lines) and a number of right eye signals including synchronizing and image information signals on a multiple signal line 556 to a right eye image source 560 (also in solid lines). Actually, the image sources 558, 560 may be either separate left and right image sources as shown in solid lines forming the rectangular blocks 558, 560 (similar to Image Sources 1 & 2 (502, 504) of FIG. 10) or may be a single image source as shown in the left half of each of the solid boxes 558, 560 by broken lines 562a, 562b, 564, 566 (similar to the Image Source 476 of FIG. 10) made up of combined units 568, 570. In that case, light valves 572, 574 are provided, as in Image Space A of FIG. 10. These would be controlled by signals on lines 576, 578 as in signal lines 492, 490 of FIG. 10.

In either event, right and left eye images on image signal lines 580, 582 are provided to either a single means 584 or separate left and right means 586, 588 for presenting images at various apparent distances. The single means 584 is controlled by a control signal on a line 590 from the control unit 552. The separate means 586, 588 are controlled by separate control lines 592, 35 594 from the control means 552.

Also in either event, the images carried by the image signal lines 580, 582 are altered into images at various apparent distances, as represented by imagesignal lines 580a, 582a, and are presented, respectively, to the left and right eyes of a passive viewer 596.

As mentioned previously, the present invention may be used in a wide variety of embodiments, but generally the embodiments will fall within one or the other of the classes of either single viewer embodiments or multiple viewer embodiments.

Similarly, although the invention has been shown and described with respect to a best mode embodiment thereof, it should be understood by those skilled in the art that various changes, omissions and deletions in the form and detail of the foregoing may be made therein without departing from the spirit and scope of the invention.

What is claimed is:

1. Apparatus for presenting stereoscopic images, comprising:

means responsive to an image signal for providing a left image signal and a right image signal; and means responsive to said left image signal and said right image signal for providing successive stereoscopic image pairs, each having a left image having an extent corresponding to a left monocular field of view and a right image having an extent corresponding to a right monocular field of view for viewing by a respective left eye and right eye of a viewer, wherein said left image and said right image are arranged so as to overlap for viewing by said left eye and said right eye in a binocular field of view having an extent less than either of said extent of said left monocular field of view or said extent of said right monocular field of view.

2. The apparatus of claim 1, wherein said left monocular field of view of said left image and said right monocular field of view of said right image overlap in a central area.

3. The apparatus of claim 1, wherein said central area is for viewing with conjugate versions of said viewer.

4. The apparatus of claim 1, wherein said central area is centered about a median line of said viewer wherein said median line perpendicularly intersects said central area.

5. The apparatus of claim 4, wherein conjugate versions of said viewer's eyes to a lateral extent of not more than approximately 45 degrees on either side of said median line of said viewer define said central area.

6. The apparatus of claim 1, wherein conjugate versions of said viewer's eyes to a lateral extent of not more than approximately 45 degrees on either side of a median line of said viewer define said central area.

7. The apparatus of claim 1, wherein said left image and said right image overlap so as to match overlapping fields of view of the left eye and the right eye of the viewer.

8. The apparatus of claim 7, wherein said overlap of said left image and said right image is for viewing with conjugate versions of said left eye and said right eye of the viewer.

9. The apparatus of claim 1, wherein a portion of said left image and a portion of said right image that overlap have areas of fine resolution that themselves overlap.

10. The apparatus of claim 9, wherein said areas of fine resolution move within said portions that overlap are for viewing by conjugate versions of said left and right eyes of the viewer.

11. The apparatus of claim 1, wherein said successive stereoscopic image pairs are provided at various apparent distances for viewing by the left eye and the right eye of the viewer at said various apparent distances.

12. The apparatus of claim 11, wherein said successive stereoscopic image pairs are for viewing at said various apparent distances by the left eye and the right eye of the viewer with a normal relationship between accommodation and convergence preserved.

13. The apparatus of claim 12, wherein a portion of said left image and a portion of said right image that overlap have areas of fine resolution that themselves overlap.

14. The apparatus of claim 13, wherein said areas of fine resolution move within said portions that overlap are for viewing by conjugate versions of said left and right eyes of the viewer.

15. Apparatus for presenting stereoscopic images, comprising:
   means responsive to an image signal for providing a left image signal and a right image signal; and
   means responsive to said left image signal and said right image signal for providing successive stereoscopic image pairs, each pair having a left image for viewing by a left eye of a viewer and a separate right image for viewing by a right eye of said viewer, wherein said left image and said right image of selected successive pairs are laterally shifted for varying a lateral separation therebetween for preserving a fixed relationship between accommodation and convergence for corresponding varying fixations of said left eye and said right eye of the viewer.

16. The apparatus of claim 15, wherein said left image and said right image overlap in a central area.

17. The apparatus of claim 16, wherein said central area is for viewing with conjugate versions of said viewer.

18. The apparatus of claim 16, wherein said central area is centered about a median line of said viewer wherein said median line perpendicularly intersects said central area.

19. The apparatus of claim 18, wherein conjugate versions of said viewer's eyes to a lateral extent of not more than approximately 45 degrees on either side of said median line of said viewer define said central area.

20. The apparatus of claim 17, wherein conjugate versions of said viewer's eyes to a lateral extent of not more than approximately 45 degrees on either side of a median line of said viewer define said central area.

21. The apparatus of claim 16, wherein said left image and said right image overlap so as to match overlapping fields of view of the left eye and the right eye of the viewer.

22. The apparatus of claim 21, wherein said overlap of said left image and said right image is for viewing with conjugate versions of said left eye and said right eye of the viewer.

23. The apparatus of claim 16, wherein a portion of said left image and a portion of said right image that overlap have areas of fine resolution that themselves overlap.

24. The apparatus of claim 23, wherein said areas of fine resolution move within said portions that overlap are for viewing by conjugate versions of said left and right eyes of the viewer.

25. The apparatus of claim 15, wherein said successive stereoscopic image pairs are provided at various apparent distances for viewing by the left eye and the right eye of the viewer at said various apparent distances.

26. The apparatus of claim 25, wherein said successive stereoscopic image pairs are for viewing at said various apparent distances by the left eye and the right eye of the viewer with a normal relationship between accommodation and convergence preserved.

27. The apparatus of claim 26, wherein a portion of said left image and a portion of said right image that overlap have areas of fine resolution that themselves overlap.

28. The apparatus of claim 27, wherein said areas of fine resolution move within said portions that overlap are for viewing by conjugate versions of said left and right eyes of the viewer.

* * * * *